United States Patent [19]

Arnoldt

[11] Patent Number: 4,509,778
[45] Date of Patent: Apr. 9, 1985

[54] DUCT JOINT ASSEMBLY

[75] Inventor: Peter J. Arnoldt, Clairton, Pa.

[73] Assignee: Ductmate Industries, Pittsburgh, Pa.

[21] Appl. No.: 447,282

[22] Filed: Dec. 6, 1982

[51] Int. Cl.³ .............................................. F16L 23/00
[52] U.S. Cl. .................................. 285/406; 285/364; 285/420; 285/424
[58] Field of Search ............... 285/363, 364, 406, 420, 285/424

[56] References Cited

U.S. PATENT DOCUMENTS

| 3,630,549 | 12/1971 | Grimm | 285/424 X |
| 3,754,782 | 8/1973 | DeLord | 285/424 X |
| 4,218,079 | 8/1980 | Arnoldt | 285/363 X |
| 4,288,115 | 9/1981 | Gullivan | 285/363 |

Primary Examiner—Richard J. Scanlan, Jr.
Attorney, Agent, or Firm—Stanley J. Price, Jr.; John M. Adams

[57] ABSTRACT

A plurality of flange portions are positioned oppositely of one another on the ends of a pair of generally rectangular sheet metal ducts. The flange portions are positioned in pairs on the adjacent ends of the ducts and each flange portion includes an upstanding wall having a pair of end portions for receiving the right angle legs of corner pieces. Four corner pieces extend into abutting relation with the upstanding walls at the four corners of the end of each duct to form a frame around the duct end portion. Each corner piece has a corner section, and a pair of legs extend angularly from the corner section. The pair of legs extend into abutting relation with the upstanding walls of adjacent flange portions on each duct end portion. In the assembled joint, the frames around the duct end portions are oppositely positioned with a gasket member positioned between the flange upstanding walls and the surfaces of abutting corner pieces. Each corner piece includes a corner and an outer edge with a corner flange. A channel-shaped clamp is forcibly slidable on the corner flanges of adjacent corner pieces to a position closely adjacent the flange upstanding walls on the duct end portions. Each clamp connects and compresses together adjacent corner pieces to exert a sealing force upon the gasket member to form an air tight seal around the assembled duct end portions.

9 Claims, 11 Drawing Figures

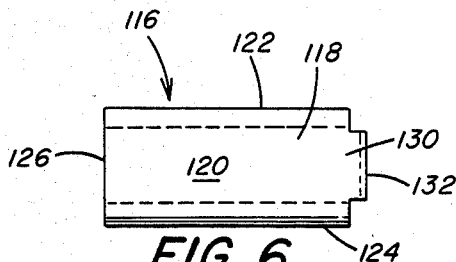
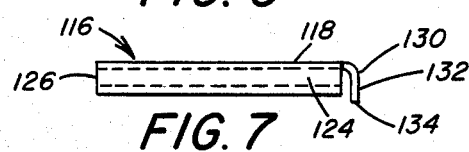
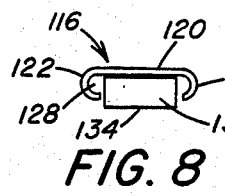
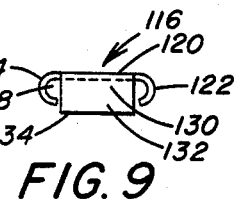
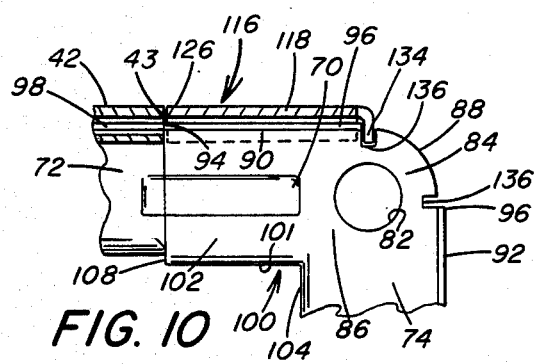
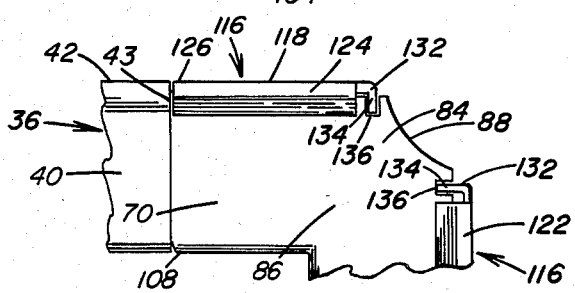
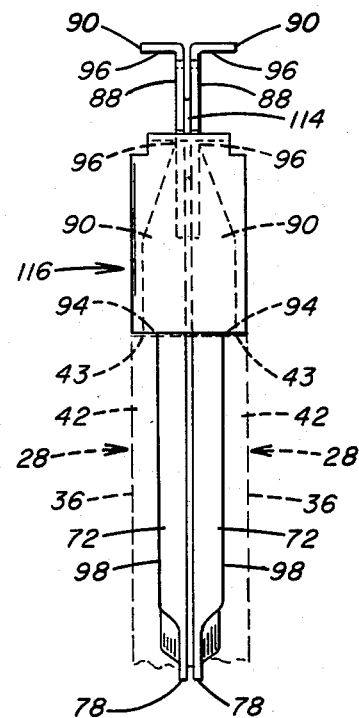

DUCT JOINT ASSEMBLY

BACKGROUND OF THE INVENTION

1. Field of the Invention

This invention relates to a joint assembly for sealingly connecting the ends of a pair of sheet metal duct sections, and more particularly to a joint assembly that includes clamps for both connecting adjacent corner pieces and exerting sealing forces upon the corner pieces.

2. Description of the Prior Art

It is well known, as disclosed in U.S. Pat. Nos. 4,218,079 and 4,288,115, to connect the ends of rectangular heating and air conditioning ducts by flange portions which are secured to the duct end portions. The flange portions include a vertical or upstanding channel for receiving the right angle leg of a corner piece. A gasket is positioned between the upstanding channels of a pair of duct end portions to be connected.

Corner pieces extend into the upstanding channels to connect adjacent channels on each duct end portion. The leg portions of the flanges on the adjacent duct end portions are bolted together by bolts which extend through aligned holes of each corner piece. Nuts are tightened on the bolts to urge the legs of the corner pieces together so as to apply a compressive force upon the upstanding channels and, thereby, compress the gasket between the upstanding channels to form a seal around the adjacent duct end portions.

One disadvantage of bolting the corner pieces together to exert a sealing force on the gasket between the upstanding channels is that the clamping force generated by overtightening the bolts tends to spread apart the outer ends of the legs of the corner pieces. If the bolts are overtightened to the extent that the legs spread apart, then an ineffective seal is formed between the upstanding channels permitting air to leak around the ends of the ducts and upwardly between the connecting flanges. Furthermore, the use of nuts and bolts in assembling a duct joint is time consuming and constitutes a substantial portion of the total expense of the duct joint assembly.

Therefore, there is need for a duct joint assembly that connects the duct ends portions in a manner that eliminates the use of nuts and bolts to sealingly connect the joined duct end portions so as to reduce the material and labor costs in assembling a duct joint.

SUMMARY OF THE INVENTION

In accordance with the present invention, there is provided a duct joint assembly for connecting the end portions of generally rectangular ducts that includes a plurality of flange portions extending upwardly from the end portion of a duct. Each of the flange portions has an upstanding wall including a pair of end portions. A plurality of angular corner pieces connect adjacent flange portions to form a rectangular frame around the duct end portion. The corner pieces each have a body portion with a corner section and a pair of leg portions extending angularly from the corner section. The pair of leg portions is arranged to extend into abutting relation with the upstanding walls of the flange portions to connect adjacent flange portions on the duct end portion. The leg portions on adjacent duct end portions are oppositely positioned with the flange portion upstanding walls separating the leg portions. The corner piece corner section includes an outer edge having a corner flange extending closely adjacent the flange portion upstanding wall. A channel-shaped clamp is forcibly slidable on the corner flanges of the oppositely positioned leg portions from the corner piece corner sections to a position closely adjacent the flange portion upstanding wall to urge the adjacent corner piece body portions toward each other to exert a sealing force upon the flange portion upstanding walls.

Further in accordance with the present invention, there is provided a corner piece for connecting a pair of flange portions for a duct joint that includes a body portion having a corner section. A pair of legs extend angularly from the corner section. The body portion has an outer edge extending from the corner section to each of the legs. A flange is positioned on the outer edge and extends from each of the legs to the corner section. A cut-out portion is positioned at the corner section to separate the flanges at the corner section.

At each corner of the duct joint a pair of channel-shaped clamps compress together the adjacent body portions of the abutting corner pieces. The compressive force is applied closely adjacent to the point where the legs of the corner pieces extend into abutting relation with the upstanding walls of the flange portions at the duct end portions. By applying compressive forces closely adjacent the flanges, the corner piece legs are prevented from being spread apart. With the present invention, the sealing forces are applied uniformly and completely around the corners of the duct end portions to substantially improve the corner sealing of the duct joint.

Preferably the channel-shaped clamps are advanced onto the abutting corner sections of the corner pieces. The clamps are forced onto the flanges on the outer edges of the corner pieces until the ends of the clamps are in substantially abutting relation with the upstanding walls. The clamps compress the corner pieces into sealing relation with the gasket material therebetween. Most preferably, each clamp is provided with a hook-like end portion that is forced into a slot that extends into the corner piece at the corner section adjacent to the flange on the outer edge of the corner section. In this manner, the clamp is securely retained on the flanges of the abutting corner pieces to compress the corner pieces together which, in turn, compress together the frame flange portions.

Accordingly, the principal object of the present invention is to provide a duct joint assembly for connecting end portions of generally rectangular ducts in which flange members extending upwardly from the duct end portions are held in sealing engagement by angular corner pieces secured together by a pair of clamps at each corner of the duct joint.

Another object of the present invention is to provide in a duct joint assembly an arrangement for connecting the corner pieces in a manner that eliminates the use of nuts and bolts to reduce the time and expense of erecting a duct joint assembly.

A further object of the present invention is to provide a corner piece that is adaptable to receive a clamp to secure together a pair of corner pieces in sealing engagement in the assembly of a duct joint for connecting duct end portions.

An additional object of the present invention is to provide a channel-shaped clamp for use in connecting adjacent corner pieces of a duct joint assembly in sealing engagement and eliminate the need for nuts and bolts to connect the corner pieces.

These and other objects of the present invention will be more completely disclosed and described in the following specification, the accompanying drawings and the appended claims.

BRIEF DESCRIPTION OF THE DRAWINGS

FIG. 5 is a top plan view of a pair of corner pieces connected by a clamp, illustrating the legs of the corner pieces extending into the frame flanges, shown in phantom.

FIG. 6 is a top plan view of the clamp.

FIG. 7 is a view in side elevation of the clamp.

FIGS. 8 and 9 are end views of the clamp shown in FIGS. 6 and 7.

FIG. 10 is an enlarged, fragmentary view of a corner piece having a slot at the corner section for receiving and holding the clamp in position on the outer flange of the corner piece.

FIG. 11 is an enlarged, fragmentary view of another embodiment of a corner piece having a concave cut-out portion at the corner of the corner piece for receiving the clamp.

DESCRIPTION OF THE PREFERRED EMBODIMENTS

Figure 1:
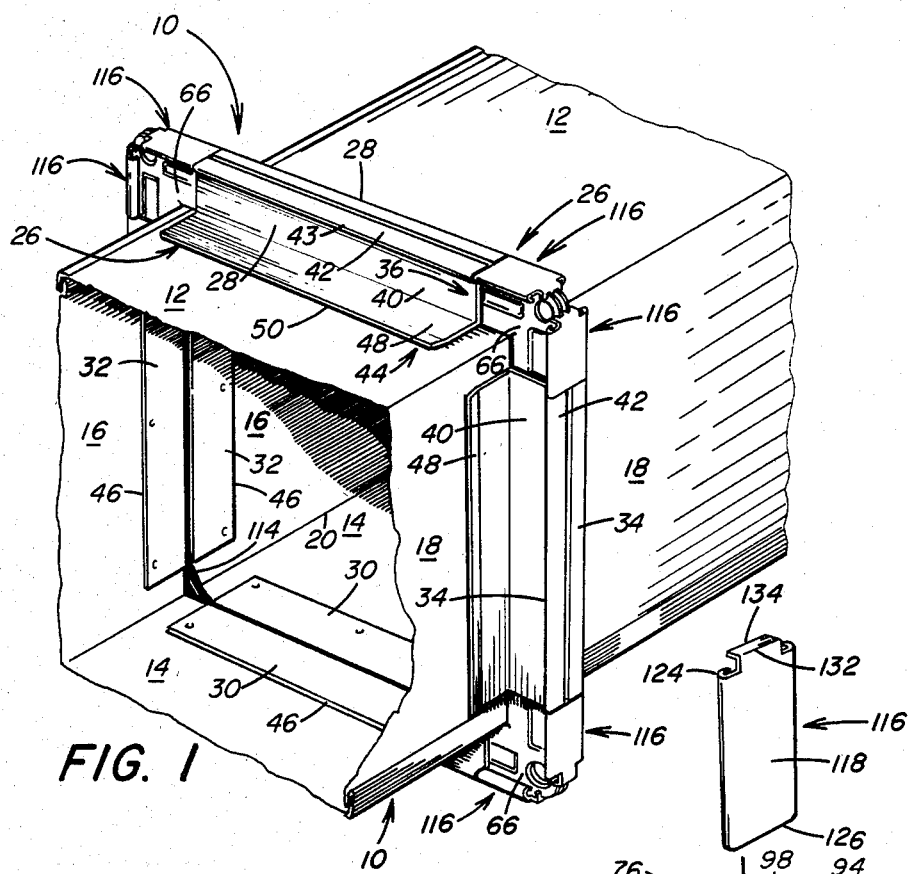
FIG. 1 is a perspective view of a duct joint for connecting adjacent duct end portions by a frame formed by flanges connected by corner pieces, illustrating clamps for securing adjacent pairs of corner pieces in sealing engagement.
Figure 2:
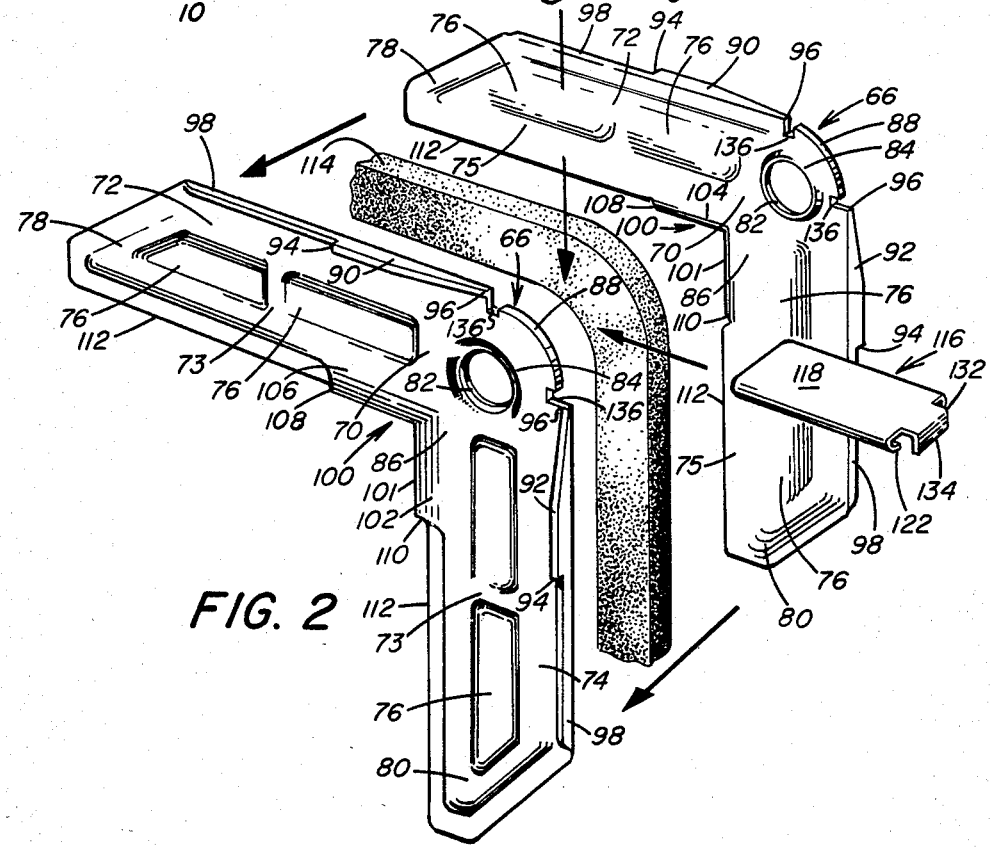
FIG. 2 is an exploded, isometric, fragmentary view of a pair of corner pieces of the present invention, illustrating gasket material which is compressed between the pair of corner pieces when connected to each other by a pair of channel-shaped clamps.
Figure 3:
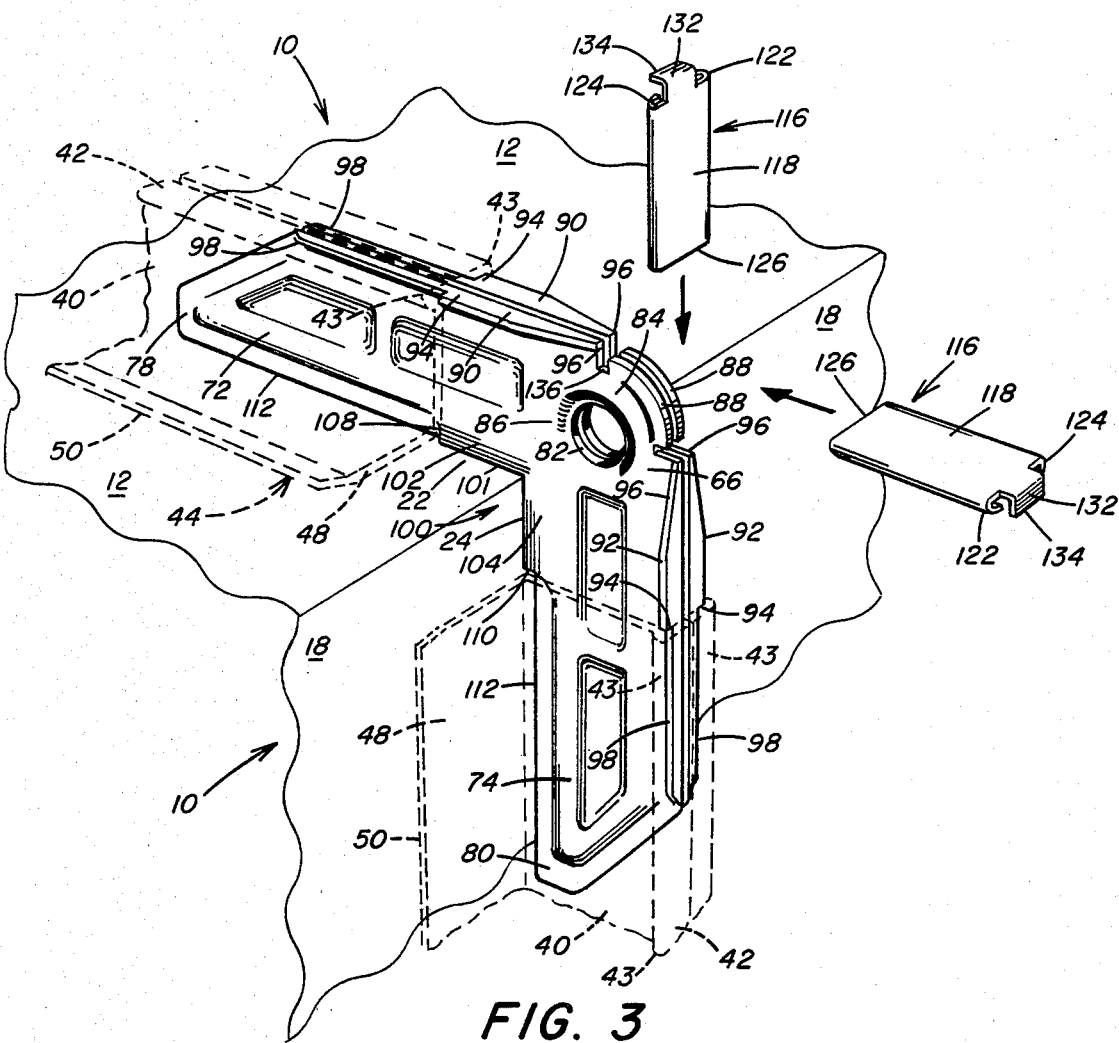
FIG. 3 is an exploded, isometric, fragmentary view of a pair of corner pieces inserted in the adjacent ends of the frame flanges shown in phantom, illustrating the outer edges of the corner pieces adapted to forcibly slidably receive a pair of clamps for connecting the corner pieces.

Referring to the drawings and particularly to FIGS. 1–3, there is illustrated the end portion of a pair of ducts generally designated by the numeral 10 in which each duct 10 has an upper wall 12, a lower wall 14, and a pair of vertical side walls 16 and 18. The ducts 10 are formed in the configuration illustrated in FIG. 1 with a longitudinally extending sealed corner joint 20 between the lower wall 14 and the side wall 16. As illustrated in FIG. 3, the upper wall 12 terminates in an end portion 22, and the side wall 18 terminates in an end portion 24. Similarly, the walls 14 and 16 terminate in end portions which extend along a plane transverse to the longitudinal axis of the duct 10.

Each of the ducts 10 preferably is fabricated from galvanized sheet material and may have various thicknesses. The galvanized surface of the duct walls also provides a relatively irregular surface so that the thickness of the sheet metal forming the duct is not uniform along the duct end portions.

The end portions of the pair of ducts 10 are secured to each other by a pair of frame members generally designated by the numeral 26. The frame members 26 are similar in construction and are secured to the duct end portions by angular corner pieces clamped together, rather than bolted, in accordance with the present invention. Each frame 26 includes an upper flange portion 28, a lower flange portion 30 and a pair of side flange portions 32 and 34. The configurations of the flange portions 28–34 are identical and are preferably cut to a preselected length from an elongated sheet metal strip that is rolled into a flange configuration which is described in greater detail in U.S. Pat. No. 4,218,079. The details of the frame flange portions 28–34 are beyond the scope of the present invention. However, it should be understood that other flange configurations and, in particular, flange portions that are rolled onto the ends of the ducts are adaptable for use with the present invention to connect the duct end portions.

Each of the flange portions illustrated in FIGS. 1 and 3 includes an upstanding channel-shaped leg portion generally designated by the numeral 36 with a front wall (not shown) connected to a rear wall 40 by a horizontal top wall 42. Extending laterally at substantially a right angle from the upstanding channel-shaped leg portion 36 is a duct receiving leg portion generally designated by the numeral 44 having a bottom wall 46 and a top wall 48. The top wall 48 has an upturned lip portion 50 to permit the end of the duct to slide between the respective walls 46 and 48, so that the end of the duct is frictionally engaged between the walls 46 and 48.

The front wall and the rear wall 40 of the upstanding channel-shaped leg portion 36 of the flange portions are spaced from each other by the top wall 42 to form a longitudinally extending opening 52 for receiving the legs of angular corner pieces. As explained in greater detail in U.S. Pat. No. 4,218,079, the front wall of the flange leg portion 36 has an inturned rebent portion (not shown) that extends inwardly into the opening 52 closely adjacent the inner surface of the front wall. The inturned portion has a tear drop configuration to form a pocket within the upstanding channel-shaped leg portion 36 above the bottom wall 46 of the flange duct receiving leg portion 44.

As known in the art, this pocket is arranged to receive a sealant material having a viscosity that permits the material to flow into position by application from a nozzle into the pocket. The duct end portion, when inserted into the duct receiving leg portion 44, partially displaces the sealant material within the pocket. The sealant material sealingly connects the duct end portion to the respective flanges to form an air-tight seal around the end of the duct within the respective frame flanges 28–34. The upstanding channel-shaped leg portion 36 of each flange 28–34 also includes a shoulder 43 that protrudes outwardly from the rear wall 40 and is formed integral with the top wall 42.

Figure 4:
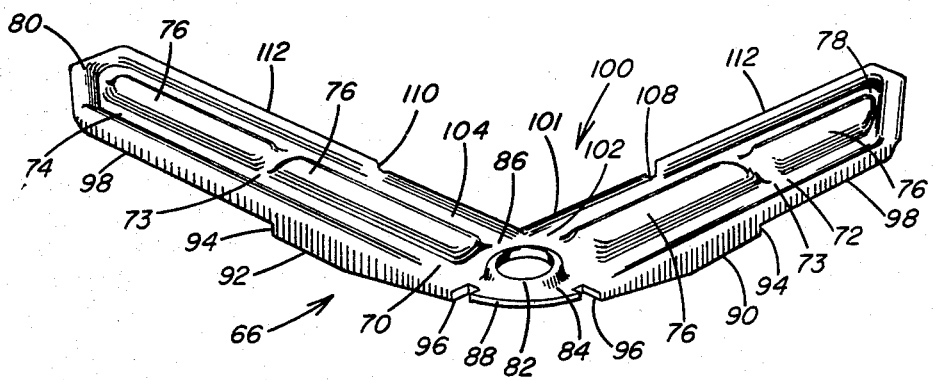
FIG. 4 is a perspective view of an angular corner piece, illustrating a corner section cut out between flanges on the outer edges of the corner piece for receiving a clamp, as shown in FIG. 3.

As illustrated in FIG. 1 and further in greater detail in FIG. 3, pairs of the adjacently positioned frame flanges 28–34 on the respective duct end portions are connected to one another by angular corner pieces 66. The corner pieces 66 are illustrated in detail in FIGS. 2 and 4 and have a generally planar configuration. Each corner piece 66 has a body portion 70 with legs 72 and 74 extending angularly therefrom and an upper planar surface 73 and a lower planar surface 75. Each corner piece 66 has elongated, recessed portions 76 which extend from a front edge 78 of the leg 72 to the body portion 70 and continue through the body portion 70 along the other leg to a location adjacent an opposite leg end portion 80.

The body portion 70 has an aperture 82 arranged to receive a drift pin or the like for aligning pairs of corner pieces 66 which are clamped together in accordance with the present invention, as will be explained later in greater detail. The body portion 70 of each corner piece 66 has an outer corner section 84 and an inner corner section 86. The outer corner section includes an arcuate portion 88 that is cut away from a pair of flanges 90 and 92 that extend on the body portion 70 on the outer edge thereof from the outer corner section 84 to the respective legs 72 and 74.

Each of the flanges 90 and 92 have opposite shoulders 94 and 96. Shoulder 94 is adjacent the respective leg portion, and the shoulder 96 is adjacent the outer corner section 84. The body portion 70 of each corner piece 66 terminates at the flange shoulders 94. Extending from the shoulders 94 is an outer flanged edge 98 on each leg 72 and 74.

Extending from the inner corner section 86 of the body portion 70 is a corner flange portion 100 having a body portion 102 that includes opposite surfaces 104 and 106 that are displaced or offset away from the body portion 70 in a manner set forth in greater detail in U.S. application Ser. No. 327,934. The corner flange portion 100 has shoulders 108 and 110 that are positioned adjacent an inner edge 112 of each leg 72 and 74.

With the above-described arrangement of each corner piece 66, the leg portions 72 and 74 are positioned in the openings of the adjacent flange portions 28 and 34 on the duct end portions, as illustrated in FIG. 3. The top walls 42 of the upstanding leg portions 36 serve as a stop to receive the corner piece shoulders 94 on the flanges 90 and 92. Thus, only the leg portions 72 and 74 extend into the flange portions 28 and 34 with the corner piece body portion 70 extending out of the flange portions 28 and 34. Further, the shoulders 108 and 110 on the corner flange portion 100 abut the above-described rebent portion on the front wall of the upstanding leg portion 36.

With each corner piece 66 positioned as illustrated in FIG. 3, the surface 104 of the offset corner flange portion 100 is displaced away from the inner surface of the front wall of the upstanding leg portion 36. This arrangement provides clearance for the edge 22 of the duct end portion to extend beyond the surface 104 of the offset corner flange portion 100 to a position closely adjacent to or in abutting relation with the inner surface of the front wall of the upstanding leg portion 36. An air-tight corner seal is thus formed around the corner of the duct end portion adjacent the frame flanges 28 and 34. Offsetting the corner flange 100 assures that the duct end portion 22 penetrates a gasket 114, illustrated in FIG. 2, between the adjacent pairs of corner pieces 66 to provide an air-tight seal around the duct end portion 22 and opposite the corner flange portion 100 of each leg portion 66.

Once the duct end portions 22 are received within the flange duct receiving leg portions 44 and the pairs of corner pieces 66 are advanced into the flange upstanding leg portions 36 to a position where the corner piece shoulders 94 abut the flange shoulders 43, the oppositely positioned pairs of corner pieces 66 are connected by clamps, generally designated by the numeral 116. A pair of clamps 116 secure together a pair of corner pieces 66 at each corner of the connected ducts 10, as illustrated in FIG. 1. Clamping together the corner pieces 66 eliminates the use of nuts and bolts, thus, preventing the problem of spreading apart the corner piece legs 72 and 74 in the flange leg portions when the nuts are overtightened on the bolts. Eliminating nuts and bolts as the means for securing together the corner pieces 66 in a duct joint reduces the time and expense in assembling a duct joint.

As illustrated in FIGS. 2 and 3 and in greater detail in FIGS. 6-9, each clamp 116 has a longitudinally extending channel-shaped body portion 118 having an upper surface 120 and a pair of downwardly depending arcuately-shaped side walls 122 and 124. The clamp body portion 118 has a first end portion 126 that opens into a channel 128 and a second end portion 130 having an end wall 132 that extends downwardly from the upper surface 120. The end wall 132 extends below the side walls 122 and 124 to close the channel 128. The end wall 132 includes a free edge 134 that extends substantially the width of the channel 128 between the side walls 122 and 124, as illustrated in FIGS. 8 and 9.

The channel 128 of the clamp 116 has a width between the side walls 122 and 124 permitting the clamp 116 to be forcibly slidably movable on the abutting outer flanges 90 and 92, as illustrated in FIG. 3 with the gasket member 114 positioned between the pairs of flanges 28 and 34 and corner pieces 66. As illustrated in FIG. 3, each clamp 116 is initially positioned so that the open end of the channel 128 is positioned opposite the abutting flanges 90 and 92. The clamp side walls 122 and 124 are positioned oppositely of the free edges of the flanges 90 and 92. The clamps 116 are inserted one at a time on the flanges 90 and 92 of the adjacent pairs of corner pieces 66 at each corner of the connection between the ducts 10.

In operation to assist in correctly aligning the abutting pairs of corner pieces 66, drift pins (not shown) are initially extended through the apertures 82. This aligns the corner pieces and places the flanges 28-34 forming the connecting frame in substantially parallel and right angle relationship. As shown in FIG. 5, each clamp 116 is forced onto the respective abutting outer flanges 90 and 92. Due to the width of the channel 128, the clamp 116 compresses the pair of corner pieces 66 together at the flanges 90 and 92. Thus, compressive forces are applied on the corner pieces 66 at a point closely adjacent the openings into the frame flange portions 28-34. Each clamp 116 is forcibly advanced on the outer flanges 90 and 92 until the clamp end portion 126 abuts or is positioned closely adjacent the top wall 42 and the shoulder 43 of the respective frame flange portions 28-34. Forcing the clamp 116 on the outer flanges 90 and 92, urges the corner piece legs 72 and 74 together, thereby, compressing the gasket member 114 between the abutting frame flange portions 28-34 and the corner pieces 66 to seal around the end portions and corners of the ducts.

To accommodate the slidable movement of the clamps 116 on the abutting outer flanges 90 and 92 of the adjacent pairs of corner pieces 66, the outer corner section 84 is cut away to form the arcuate portion 88. The outer edge of the arcuate portion 88 is positioned below the horizontal surfaces of the outer flanges 90 and 92 on the corner pieces 66. The cut-away portion 88 shown in FIG. 10 has a convex configuration; however, as shown in FIG. 11, the portion 88 can be concave. Also the corner pieces 66 can be provided with or without the aperture 82, as illustrated in FIG. 11.

As illustrated in FIGS. 2, 3, 4, 10, and 11, a recess or slot 136 extends downwardly into the corner section 84 from the outer edge thereof. The slot 136 divides the arcuate portion 88 from the shoulders 96 of the respective outer flanges 90 and 92. The slot 136 receives the free edge 134 of the clamp 116 when the clamp 116 is advanced on the respective flange 90 and 92 to the point on the abutting corner pieces 66 to where the end portion 126 is positioned closely adjacent or abutting the end of the frame member flange portion top walls 42 and shoulders 43. Preferably, to insure that the clamps 116 are fully seated on the corner pieces 66, an impact blow is applied to the end wall 132 to force the edge 134 into the slot 136. This arrangement positions the clamp 116 securely in place to clamp together the corner pieces 66.

In the assembled joint as illustrated in FIG. 3, when the corner piece legs 72 and 74 are positioned in the openings of the flange portions 28 and 34, the upper edges 98 of the legs 72 and 74 abut the undersurface of the horizontal walls 42, and the lower edges 112 abut the inturned rebent portion of the upstanding leg portions 36. The outer surfaces of the concave recessed portions 76 of legs 72 and 74 abut the inner surfaces of the rear walls 40 while the remaining portions of the legs abut the inner surfaces of the front wall. With this arrangement, the legs 72 and 74 of the corner pieces 66 abut the surfaces of both the front walls and rear walls 40 of the flange upstanding leg portions 36. This arrangement, as described in greater detail in U.S. Pat. No. 4,218,079, provides a rigid, sturdy connection between the corner piece leg portions and the frame flange portions.

In the assembled joint as illustrated in FIG. 3, the shoulders 94 of the outer flange portions 90 and 92 and the shoulders 108 and 110 on the corner-flange portion 100 are arranged to abut the ends of the frame flange portions 28 and 34 so that the inner and outer corner sections 84 and 86 of the corner piece body portion 70 do not extend into the longitudinal openings 52 of the respective flange portions 28 and 34. In this position, the offset corner flange portion 100 is in juxtaposition with the ends of the frame flange portions 28 and 34.

By offsetting the corner flange portion 100, clearance is provided between an outer free edge 101 of the corner flange portion 100 and the surface 60 of the duct receiving leg portion bottom wall 46 to permit the edge 22 of the duct end portion to pass beyond the edge 101 to a position closely adjacent the inner surface of the front wall of the upstanding channel-shaped leg portion 36. This arrangement assures that the end of the duct penetrates into sealing relation both the sealant material within the frame flange portions 28 and 34, as well as into the gasket member 114 that is positioned between the abutting pairs of frame flange members 28 and 34 and corner pieces 66.

With the feature of the clamps 116 eliminating the use of conventional nuts and bolts to secure the corner pieces 66 to each other, improved sealing around the duct end portions is achieved by the application of clamping forces upon the corner piece 66 over a considerable distance that extends along the outer flanges 90 and 92. This clamping force is also applied closely adjacent to the openings 52 into the frame flange members 28-34 as opposed to being concentrated only at the outer corner section 84 with the conventional nut and bolt connection of the corner pieces 66.

The clamps 116 exert compressive forces along the body portion 70 of the adjacent corner pieces 66 and, thereby, serve to urge the corner piece legs 72 and 74 toward each other with the frame flange members 28-34 to compress the gasket material 114 therebetween. Use of the clamps 116 instead of nuts and bolts overcomes the problem of over-tightening nuts and bolts to secure together the corner pieces 66. With the present invention, the optimum sealing forces are achieved when the clamps 116 are securely seated in position on the abutting flanges 90 and 92 of corner pieces 66 with the clamp end portion 126 closely positioned adjacent to the top wall 42 of the respective frame flange portions and the free edge 134 seated in the slot 136 of the cut-out corner section 84. The clamps 116 apply the desired compressive forces over a greater distance along the length of the corner piece body portions 70 than otherwise available with the conventional nut and bolt method of connecting corner pieces 66.

Further with the present invention, by substituting the clamps 116 for the conventional nuts and bolts, the time for assembling a duct joint is greatly reduced. The optimum compressive forces are automatically achieved once the clamps 116 are seated in the slots 136, thereby, eliminating the problems of overtightening nuts and bolts. Consequently, the compressive forces on the gasket material 114 are uniformly applied around the entire duct joint. Substantial material savings are also achieved in the substitution of the clamps 116 to connect adjacent corner pieces 66 as opposed to the use of nuts and bolts.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:
1. A duct joint assembly for connecting the end portion of generally rectangular ducts comprising,
 a plurality of flange portions extending upwardly from the end portion of a duct,
 each of said flange portions having an upstanding wall and a pair of opposite end portions,
 a plurality of angular corner pieces for connecting adjacent flange portions and forming a rectangular frame around the duct end portions,
 said corner pieces each having a body portion with a corner section and a pair of leg portions extending angularly therefrom,
 each of said leg portions arranged to extend into abutting relation with said upstanding wall of said flange portions to connect adjacent flange portions on the duct end portion,
 said corner piece leg portions on adjacent duct end portions positioned adjacent to each other with said duct flange portion upstanding walls separating said corner piece leg portions,
 said body portion of each of said corner pieces having an outer edge extending from said corner section to each of said leg portions,
 a flange positioned on said outer edge of each said corner piece body portions and extending from each of said leg portions to said corner section,
 a channel-shaped clamp forcibly slidable only on said flanges of said adjacent corner piece body portions to urge said adjacent corner piece body portions toward each other and connect said rectangular frames of adjacent rectangular ducts and exert a sealing force upon said respective duct adjacent flange portion upstanding walls, and locking means to lock said channel-shaped clamp on said adjacent corner pieces.

2. A duct joint assembly for connecting the end portions of generally rectangular ducts comprising, a plurality of receiving channels extending upwardly from the end portion of a duct, each of said receiving channels including opposite channel open end portions, stop means on each of said receiving channels adjacent said channel open end portion, a plurality of angular corner pieces for connecting adjacent receiving channels to form a rectangular frame around the duct end portion, said corner pieces each having a body portion with a corner section and a pair of leg portions extending angularly therefrom, said pair of leg portions arranged to extend through said channel open end portions into said receiving channels and form said rectangular frame by connecting said adjacent receiving channels on the duct end portion, said leg portions on adjacent duct end portions positioned adjacent to each other in said respective receiving channels, said body portion of each of said corner pieces having an outer edge extending from said corner section to said leg portions, a corner piece flange positioned on said outer edge of each of said corner piece body portions and extending from said leg portion to said corner section, and a clamp engageable only with said corner piece flanges of said adjacent corner piece body portions to connect together said rectangular frames of adjacent rectangular ducts and engage said stop means on said receiving channels and limit the slidable movement of said clamp on said adjacent corner piece body portions and exert a sealing force upon adjacent receiving channels.

3. A duct joint assembly for connecting the end portions of generally rectangular ducts comprising, a plurality of receiving channels extending upwardly from the end portion of a duct, each of said receiving channels including opposite channel open end portions, abutment means on each of said receiving channels adjacent said respective channel open end portion, a plurality of angular corner pieces for connecting adjacent receiving channels to form a rectangular frame around the duct end portion, said corner pieces each having a body portion with a corner section and a pair of leg portions extending angularly therefrom, said pair of leg portions arranged to extend through said channel open end portions into said receiving channels to connect adjacent receiving channels on the duct end portion, said leg portions on adjacent duct end portions being oppositely positioned with said receiving channel separating said leg portions, said corner piece body portion including a flange extending from each of said leg portions to said corner section, said flange having an outer flange edge extending on said corner piece body portion into abutting relation with said abutment means on said receiving channel, and a clamp forcibly slidable on said flanges of said adjacent corner piece body portions to engage said outer flange edge and contact said abutment means to limit the slidable movement of said clamp to a position on said adjacent corner piece body portions and connect said rectangular frames of adjacent rectangular ducts and exert a sealing force upon said adjacent receiving channels.

4. A corner piece for connecting adjacent flange portions and forming a rectangular frame on an end portion of a duct and connecting adjacent duct end portions comprising, a body portion having a corner section and a pair of legs extending angularly from said body portion, said body portion having an outer edge extending from said corner section to each of said legs, a flange positioned on said outer edge and extending from each of said legs to said corner section, said flange having a lateral surface, a recessed portion at said corner section extending below said lateral surface to separate said flanges at said corner section, said recessed portion adapted to receive and guide clamping means on said flanges for connecting adjacent end portions of said ducts, and, slotted portions in said recessed portion adjacent said flanges for receiving and locking said clamping means in position on said flanges of adjacent corner pieces connecting adjacent end portions of said ducts.

5. A clamp assembly for connecting adjacent corner pieces in a duct joint comprising, a pair of adjacently positioned corner pieces each having a body portion with a corner section and a pair of legs extending angularly from said body portion, said body portion of each said corner piece having an outer edge extending from said corner section to each of said legs, a flange positioned on said outer edge and extending from each of said legs to said corner section, each said flange having a lateral surface and each said flange of each said corner piece being in adjacent relation to said adjacent flange of said adjacently positioned corner piece, an arcuate recessed portion at said corner section extending below said lateral surface to separate said flanges at said corner section, channel shaped means adapted to be guided by said arcuate recessed portion onto said abutting flanges of adjacently positioned corner pieces to securely connect said adjacently positioned corner pieces to each other, and slotted portions in said arcuate recessed portion adjacent said flanges for receiving and locking said channel shaped means in position on said flanges of adjacent corner pieces and connecting adjacent end portions of ducts.

6. A method of connecting the end portions of a pair of generally rectangular ducts comprising, providing a pair of duct end portions each having a plurality of duct flange portions with a vertical wall extending upwardly from the adjacent duct end portions and a lateral wall extending laterally from said vertical wall, said lateral wall having an upper horizontal surface, and corner pieces frictionally secured to said flange portions to form a rectangular frame around each of said duct end portions, each of said corner pieces having a body portion outside of said flange portions with a flange extending laterally therefrom, positioning said duct end portions in abutting relation to each other with said respective flanges on said corner pieces facing away from each other and in substantially the same plane, and slidably positioning only on said adjacent corner piece flanges channel shaped clamps having a top horizontal surface, with said duct flange portion horizontal surfaces of said lateral walls in substantially the same plane as said clamp top horizontal surfaces to connect said end portions of said ducts to each other and exert a sealing force upon said respective adjacent duct flange portions with said channel shaped clamp top horizontal surfaces in substantially the same plane as said horizontal surfaces of said duct flange portion lateral walls.

7. A method of connecting the end portions of a pair of generally rectangular ducts as set forth in claim 6 which includes, said duct end portion flange portions having opposite end portions, sliding said channel shaped clamps into abutting relation with the end portions of said duct flange portions on said duct end portions.

8. A method of connecting the end portions of a pair of generally rectangular ducts as set forth in claim 6 which includes, positioning an end portion of each said channel shaped clamp in a slot on each said corner piece to lock said channel shaped clamp on said corner pieces.

9. A duct joint assembly for connecting the end portions of generally rectangular ducts comprising, a plurality of receiving channels extending upwardly from the end portion of a duct, each of said receiving channels including opposite channel open end portions, abutment means on each of said receiving channels adjacent said respective channel open end portions, a plurality of angular corner pieces for connecting adjacent receiving channels to form a rectangular frame around the duct end portion, said corner pieces each having a body portion with a corner section and a pair of leg portions extending angularly therefrom, said pair of leg portions arranged to extend through said channel open end portions into said receiving channels to connect adjacent receiving channels on the duct end portion, said leg portions on adjacent duct end portions being positioned opposite each other with said receiving channels of adjacent duct end portions separating said leg portions, said corner piece body portion having a clamp engaging portion extending into abutting relation with said abutment means on said receiving channel, and a clamp forcibly slidable on said clamp engaging portions of said adjacent corner piece body portions to engage said adjacent corner piece body portions and contact said abutment means to limit the slidable movement of said clamp to a position on said adjacent corner piece body portions and connect said rectangular frames of adjacent rectangular ducts and exert a sealing force upon said adjacent duct end portion receiving channels.

* * * * *